United States Patent [19]

Chu et al.

[11] 4,055,546

[45] Oct. 25, 1977

[54] NOVEL THERMOSETTING RESINS AND PROCESS FOR PREPARING THE SAME

[75] Inventors: Tzong Jeng Chu; Susumu Konii, both of Shimodate, Japan

[73] Assignee: Hitachi Chemical Company, Ltd., Tokyo, Japan

[21] Appl. No.: 646,671

[22] Filed: Jan. 5, 1976

Related U.S. Application Data

[63] Continuation-in-part of Ser. No. 302,207, Oct. 30, 1972, Pat. No. 3,950,309.

[30] Foreign Application Priority Data

Oct. 29, 1971 Japan .................................. 46-85520
Oct. 29, 1971 Japan .................................. 46-85521

[51] Int. Cl.² ........................ C08G 8/28; C08G 10/04
[52] U.S. Cl. ..................................... 260/51 R; 260/54; 260/55; 260/56; 260/59 R; 260/67 H
[58] Field of Search .................... 260/67 A, 59 R, 54, 260/55, 51 R, 56

[56] References Cited

U.S. PATENT DOCUMENTS

| | | | |
|---|---|---|---|
| 2,555,489 | 6/1951 | Hirsch | 260/67 |
| 2,645,630 | 7/1953 | Speier | 260/53 |
| 2,711,417 | 6/1955 | Frisch | 260/448.2 |
| 3,081,269 | 3/1963 | Shannon et al. | 260/2.5 |
| 3,755,269 | 7/1956 | Moorhead | 260/42 |
| 3,847,860 | 11/1974 | Seiler et al. | 260/38 |

*Primary Examiner*—Harold D. Anderson

*Assistant Examiner*—E. A. Nielsen

*Attorney, Agent, or Firm*—Armstrong, Nikaido & Marmelstein

[57] ABSTRACT

A novel thermosetting resin, the thermoset resin obtained therefrom having such a thermal resistance that the temperature at which the thermoset resin is caused to show a weight loss of 6% by heating at a temperature elevation rate of 10° C. per minute is at least 400° C., is prepared by reacting a specific phenolic resin with a member selected from the group consisting of a silicic acid ester of the formula $Si(OR)_4$ wherein R represents alkyl or aryl and a mixture of a silicic acid ester of the formula as defined above and a titanic acid ester of the formula $Ti(OR)_4$ wherein R has the same meaning as defined above in the presence of an alkaline catalyst while keeping the reaction system in a molten state, to an extent that 20– 70 mole %, based on the phenol present in the starting system to be reacted with said member, of phenolic hydroxyl groups in terms of the amount of phenol, remain unreacted. The thus obtained novel resins of the present invention can be easily set or hardened in accordance with the ordinary manner; namely by mixing with a thermohardening agent such as hexamethylenetetramine and then heating, to give thermoset resins having a superior thermal resistance as compared with the conventional phenolic resins. In addition, the thermoset resins obtained from the novel resins of this invention are excellent in mechanical strength, electrical properties and luster of molded articles.

14 Claims, No Drawings

NOVEL THERMOSETTING RESINS AND PROCESS FOR PREPARING THE SAME

This is a continuation-in-part of our copending application U.S. Ser. No. 302,207, filed Oct. 30, 1972 now U.S. Pat. No. 3,950,309.

This invention relates to novel thermosetting resins and a process for preparing the same.

More particularly, this invention relates to a novel thermosetting resin possessing a superior property in respect of thermal resistance and a process for preparing the same.

In recent years there has increased a demand for heat-resistant plastic materials to be used for the industrial purposes and many attempts have been made to develop such heat-resistant plastic materials. In fact, although there is an increasing use requiring high heat-resistance of the various molded articles, there have rarely been found thermosetting resins, particularly phenolic resins, which are resistant to temperatures as high as more than 400° C. It is well known that the thermal stability of conventional phenol-formaldehyde resins is insufficient for the various uses since the methylene bridges tend to be thermally decomposed at relatively high temperature.

For the purpose of developing thermosetting resins possessing a superior property in respect of thermal resistance, we have made intensive studies, particularly, on phenolic resins. As a result, it has been unexpectedly found that a phenolic resin is reacted with a member selected from the group consisting of a silicic acid ester and a mixture of a silicic acid ester and a titanic acid ester to have oxygens of the phenolic hydroxyl groups of the phenolic resin bonded directly to silicon or silicon and titanium whereby the thermal stability of the resulting resin can be greatly improved.

It is, accordingly, an object of the present invention to provide a thermosetting resin, the thermoset resin obtained therefrom being superior in thermal resistance.

It is another object of the present invention to provide a process for the preparation of a thermosetting resin of the character described, which is simple in operation and commercially useful.

The foregoing and other objects, features and advantages of this invention will become apparent to those skilled in the art from the following detailed description.

Essentially, according to the present invention, there is provided a thermosetting resin, the thermoset resin obtained therefrom having such a thermal resistance that the temperature at which the thermoset resin is caused to show a weight loss of 6% by heating at a temperature elevation rate of 10° C. per minute is at least 400° C., which comprises a reaction product of a novolak which is obtained by the reaction of a phenol and an aldehyde in the presence of an acid catalyst or a novolak type aryl-modified phenolic resin which is obtained by the reaction of a phenol and an aromatic hydrocarbon-aldehyde condensation initial-stage reaction product with a member selected from the group consisting of a silicic acid ester of the formula $Si(OR)_4$ wherein R represents alkyl or aryl and a mixture of a silicic acid ester of the formula as defined above and a titanic acid ester of the formula $Ti(OR)_4$ wherein R has the same meaning as defined above, said reaction product having such structure that the silicon is or silicon and titanium are bonded directly to oxygens of the phenolic hydroxyl groups while 20 – 70 mole %, based on the phenol present in the starting system to be reacted with said member, of the phenolic hydroxyl groups, in terms of the amount of phenol, are left in the free form. Such novel thermosetting resin can be prepared by reacting a novolak which is obtained by the reaction of a phenol and an aldehyde in the presence of an acid catalyst or a novolak type aryl-modified phenolic resin which is obtained by the reaction of a phenol and an aromatic hydrocarbon-aldehyde condensation initial-stage reaction product with a member selected from the group consisting of a silicic acid ester of the formula $Si(OR)_4$ wherein R represents alkyl or aryl and a mixture of a silicic acid ester of the formula as defined above and a titanic acid ester of the formula $Ti(OR)_4$ wherein R has the same meaning as defined above in the presence of an alkaline catalyst while keeping the reaction system in a molten state, to an extent that 20 – 70 mole %, based on the phenol present in the starting system to be reacted with said member, of phenolic hydroxyl groups, in terms of the amount of phenol, remain unreacted.

The phenolic condensation initial-stage reaction product to be employed as a starting material in the process of the present invention; namely, a novolak or a novolak type arylmodified phenolic resin consisting of a reaction product of a phenol and an aromatic hydrocarbon-aldehyde condensation initial-stage reaction product, is a known product and can readily be prepared in accordance with the ordinary method. Thus, illustratively stated, according to the process of this invention, a phenol is reacted with an aldehyde of an amount of 0.7 – 1.0 moles, preferably 0.75 – 0.9 moles per mole of the phenol at a temperature of 80 – 150° C. in the presence of an acid catalyst for 10 – 250 minutes to form a novolak having a desired degree of condensation, followed by removal of the aldehyde remaining unreacted and the water produced during the reaction under reduced pressure, an alkaline catalyst is added to render the reaction system alkaline and then a silicic acid ester or a mixture of a silicic acid ester and a titanic acid ester is added to allow the reaction to proceed, while keeping the reaction system in a molten state, to an extent that 20 – 70 mole %, based on the phenol present in the starting system to be reacted with the ester, of phenolic hydroxyl groups, in terms of the amount of phenol, remain unreacted. In case an aromatic hydrocarbon-aldehyde condensation initial-stage reaction product is employed, a phenol is reacted with the aromatic hydrocarbon-aldehyde condensation initial-stage product of an amount of 1 – 2 parts by weight, preferably 1.1 – 1.3 parts by weight per part by weight of the phenol in the presence of a strong acid catalyst, such as sulfuric acid, benzenesulfonic acid, p-toluenesulfonic acid, hydrochloric acid or the like at a temperature of 80 – 200° C. for 30 – 300 minutes followed by removal of water under reduced pressure and an alkaline catalyst is added to render the reaction system alkaline, whereupon a silicic acid ester or a mixture of a silicic acid ester and a titanic acid ester is added to allow the reaction to proceed, while keeping the reaction system in a molten state, to an extent that 20 – 70 mole %, based on the phenol present in the starting system to be reacted with the ester, of phenolic hydroxyl groups, in terms of the amount of phenol, remain unreacted. It is widely known that similarly to a novolak, the novolak type aryl-modified phenolic resins are thermoset by reaction with hexamethylenetetramine and can be employed as a molding material (See, for example Japanese patent application publication No. 21753/1968).

The term "a phenol" used herein is intended to mean a monohydric phenol such as phenol (monohydroxybenzene), cresol or the like; a polyhydric phenol such as 2,2-bis(p-hydroxyphenyl)propane(bisphenol A), 2,6-bis(2-hydroxybenzyl) phenol or the like; or a mixture thereof.

The term "aldehyde" used herein is intended to mean an aldehyde capable of forming a phenolic resin in cooperation with a phenol, for example formaldehyde, acetaldehyde, furfural or the like.

The aromatic hydrocarbon-aldehyde condensation initial-stage reaction products to be employed in the process of this invention are suitably those having an average molecular weight of 250 - 1,000 and include resins obtained by condensation reaction of an aldehyde with xylene, toluene, acenaphthene, cymene, mesitylene, 2,4-trimethylbenzene, durene, naphthalene, pentamethylbenzene, acenaphthylene and the like.

Examples of the silicic acid esters to be employed in this invention include tetramethoxysilane, tetraethoxysilane, tetrapropoxysilane, tetrabutoxysilane, tetraphenoxysilane and tetrabenzyloxysilane, which may be employed alone or in mixture thereof. Examples of the titanic acid esters to be employed in this invention include titanium tetraisopropoxide, titanium tetrabutoxide, tetra(2-ethyl)hexyl titanate, tetrastearyl titanate, titanyl acetylacetonate and titanium tetraphenoxide, which may be employed alone or in mixture.

In carrying out the process of the present invention, it is of importance to terminate the reaction so that 20 - 70 mole %, based on the phenol present in the starting system to be reacted with the ester, of the phenolic hydroxyl groups, in terms of the amount of phenol, may remain unreacted. It is achieved by controlling the amount of ester employed. Illustratively stated, while the silicic acid esters may be employed in mixture with titanic acid esters, the silicic acid ester or its mixture with a titanic acid ester may be employed in an amount of 0.02 - 0.2 molar equivalents, based on the amount of phenol or phenolic value in the starting system to be reacted with the ester.

The reaction is effected while keeping the reaction system in a molten state but attention should be given so that the reaction temperature is kept below the boiling point of the silicic acid ester and the titanic acid ester, if any, employed. The reaction time is not critical but is usually 20 - 150 minutes for which substantially all of the silicic acid ester and the titanic acid ester, if any, is reacted with phenol component present in the starting system. The reaction is carried out in the presence of an alkaline catalyst. Examples of suitable alkaline catalysts include alkali and alkaline earth metal hydroxides such as potassium hydroxide, sodium hydroxide, lithium hydroxide, calcium hydroxide, barium hydroxide, strontium hydroxide and magnesium hydroxide; primary amines such as methylamine, ethylamine, propylamine and butylamine; secondary amines such as ethylenediamine and diethylamine; and tertiary amines such as triethanolamine. The reaction system is maintained at an alkaline condition, preferably at a pH value of 7.5 - 10.0.

As described hereinbefore, the present invention has been made, based on such novel finding that if, partly in substitution for hydrogens of the phenolic hydroxyl groups of the novolak or the novolak type aryl-modified phenolic resin from a phenol and an aromatic hydrocarbon-aldehyde condensation initial-stage reaction product, silicon is or silicon and titanium are bonded to oxygens of said phenolic hydroxyl groups, the resulting phenolic resin is imparted with a superior thermal resistance, that is, the thermoset resin obtained such resulting phenolic resin has such excellent thermal resistance that the temperature at which the thermoset resin is caused to show a weight loss of 6% by heating at a temperature elevation rate of 10° C. per minute is at least 400° C. Differently stated, the thermosetting resins of the present invention have an entirely novel structure. For explaining this feature of this invention more clearly, the reaction formula in the process according to this invention is given below, taking as an example the case where typical materials are employed.

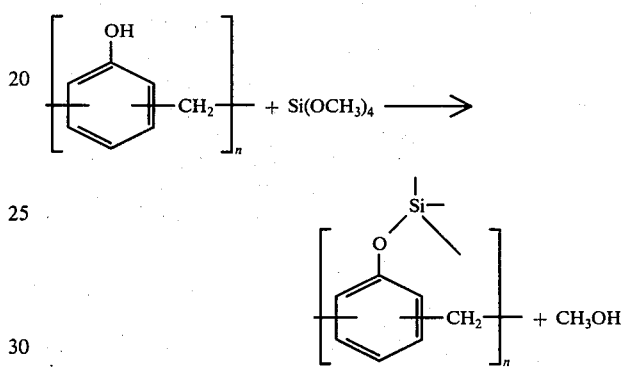

wherein $n$ is 3 - 10 in average. As apparent from the above, the incorporation of silicon or silicon and titanium bonded to oxygens of the phenolic hydroxyl groups into the structure of resin is essential to the present invention. Such incorporation of silicon or silicon and titanium is effected with expulsion of the corresponding alcohol to the ester used. Accordingly, the kinds of classes of the alkyl or aryl have no significance in the present invention.

The thus obtained novel resins of the present invention can be easily set or hardened in accordance with the ordinary manner; namely by mixing with a thermohardening agent such as hexamethylenetetramine (hexamine), polyoxymethylene or the like and then heating, to give thermoset resins having a superior thermal resistance as compared with the conventional phenolic resins. In addition, the thermoset resins obtained from the novel resins of this invention are excellent in mechanical strength, electrical properties and luster of molded articles. Particularly, when xylene-formaldehyde resin is employed as an aromatic hydrocarbon-aldehyde resin in this invention, the resulting resin has an excellent property in respect of adhesiveness to metals.

The following examples are given only for the purpose of illustrating this invention.

EXAMPLE 1

245 g. of phenol (monohydroxybenzene) and 165 g. of formalin (formaldehyde content: 37% by weight. The same is referred to the following examples) were charged in a four-neck flask and 2 ml. of 1N HCl were then added while stirring. The reaction was allowed to proceed at 100° C. for 90 minutes, followed by removal of water under reduced pressure. To the resulting reaction mixture 8 ml. of a 10% aqueous solution of potassium hydroxide were added at 100° C., immediately whereupon 54 g. of tetraethoxysilane were added and heated to 130° C. The reaction was allowed to proceed for 100 minutes and then the reaction mixture was concentrated to give a white, solid resin. To the thus obtained resin were added 10% by weight of hexamine and heated at 170° C. to obtain an infusible product, the thermal resistance of which is given in Table 1 (shown later).

EXAMPLE 2

In the substantially same manner as described in Example 1, 94 g. of phenol, 82 g. of bisphenol A and 65 g. of formalin were charged in a flask and molten, with stirring, by heating. 1 ml of 1N HCl were added at 100° C. for 30 minutes, followed by removal of water under reduced pressure. Then, 6 ml. of a 10% aqueous solution of potassium hydroxide were added at 100° C., immediately whereupon 30 g. of tetraethoxysilane were added and heated to 145° C. The reaction was allowed to proceed for 120 minutes followed by concentration under reduced pressure to give a white, solid resin. The resin was hardened by mixing with 10% by weight of hexamine and heating. The thermal resistance of the thermohardened resin is given in Table 1.

EXAMPLE 3

In the substantially same manner as described in Example 1, 100 g. of Nikanol H (trade name of xylene-formaldehyde resin manufactured and sold by Nihon Gasu Kagaku Kabushiki Kaisha, Japan and having an average molecular weight of 350 – 500 and a viscosity $[\zeta]$ 20° C of 3,000 – 100,000) and 130 g. of phenol were charged in a flask and 1.5 ml. of benzenesulfonic acid (purity: 80%) were added, whereupon the reaction was allowed to proceed at 95° C. for 100 minutes, followed by removal of water. Then, 8 ml. of a 10% aqueous solution of potassium hydroxide at 105° C. and subsequently 34.5 g. of tetraethoxysilane were added. The reaction system was heated to 130° C. and the reaction was allowed to proceed for 100 minutes, followed by concentration to give a white, solid resin. The thus obtained resin could easily be hardened by heat-treatment using 10% by weight of hexamine. The thermal property is shown in Table 1.

EXAMPLE 4

In the substantially same manner as described in Example 1, 100 g. of the Nikanol H and 130 g. of phenol were charged in a flask, whereupon 1.5 g. of p-toluenesulfonic acid were added. The reaction was allowed to proceed at 95° C. for 100 minutes, whereupon 5 ml. of a 10% aqueous solution of potassium hydroxide to render the reaction system weakly alkaline. Then, 23 g. of formalin were added to allow the reaction to proceed for 30 minutes, followed by removal of water under reduced pressure. When the temperature was elevated to 105° C., 3 ml. of a 10% aqueous solution of potassium hydroxide were added and then 34.5 g. of tetraethoxysilane were added. The reaction system was heated to 130° C. to allow the reaction to proceed for 100 minutes, followed by concentration to give a white, solid resin. The thus obtained resin was hardened with a comparatively high velocity by heat-treatment using 10% by weight of hexamine. The thermal property is shown in Table 1.

EXAMPLE 5

The substantially same procedure as described in Example 1 was repeated except that tetrapropoxysilane was employed in place of tetraethoxysilane. There was obtained a white, solid resin. The resin was mixed with 10% by weight of hexamine and heated to effect hardening. The thermal property of the thus obtained thermohardened resin is shown in Table 1.

EXAMPLE 6

The substantially same procedure as described in Example 3 was repeated except that tetrapropoxysilane was employed in place of tetraethoxysilane. There was obtained a white, solid resin. The resin was mixed with 10% by weight of hexamine and heated to effect hardening. The thermal property of the thus obtained thermohardened resin is shown in Table 1.

EXAMPLE 7

The substantially same procedure as described in Example 1 was repeated except that tetrabutoxysilane was employed in place of tetraethoxysilane. There was obtained a white, solid resin. The resin was mixed with 10% by weight of hexamine and heated to effect hardening. The thermal property of the thus obtained thermohardened resin is shown in Table 1.

EXAMPLE 8

The substantially same procedure as described in Example 3 was repeated except that tetrabutoxysilane was employed in place of tetraethoxysilane. There was obtained a white, solid resin. The resin was mixed with 10% by weight of hexamine and heated to effect hardening. The thermal property of the thus obtained thermohardened resin is shown in Table 1.

EXAMPLE 9

282 g. of phenol, 90 g. of paraformaldehyde and 28 g. of water were charged in a four-neck flask and heated, while stirring, to dissolve the paraformaldehyde, whereupon the temperature was lowered to 65° C. and 0.282 g. (0.1% by weight based on the phenol) of p-toluenesulfonic acid were added. The temperature was elevated to 90° C. and then, the reaction was allowed to proceed at 90° C. for 60 minutes, followed by removal of water under a reduced pressure of 600 mmHg. At 90° C. a 10% aqueous solution of potassium hydroxide was added to adjust a pH value of the reaction system to 7.5 and water was completely removed, whereupon 28.4 g. of titanium tetraisopropoxide were added and the temperature was elevated to 105° C. At that temperature the reaction was allowed to proceed for 60 minutes. Then, 31.2 g. of tetraethoxysilane were added and the temperature was elevated to 130° C., whereupon the reaction was allowed to proceed for 60 minutes, followed by concentration under reduced pressure to obtain a red, opaque, solid resin. The resin was mixed with 10% by weight of hexamine and heated at 170° C. to effect hardening. The thermal property of the thus obtained thermohardened resin is shown in Table 1.

EXAMPLE 10

282 g. of m-cresol and 165 g. of formalin (formaldehyde content: 37% by weight. The same is referred to the following examples) were charged in a four-neck flask and 1.5 ml. of 1N HCl were then added while stirring. The reaction was allowed to proceed at 100° C.

for 70 minutes, followed by removal of water under reduced pressure. To the resulting reaction mixture 8 ml. of a 10% aqueous solution of potassium hydroxide were added at 100° C., immediately whereupon 54 g. of tetraethoxysilane were added and heated to 130° C. The reaction was allowed to proceed for 100 minutes and then the reaction mixture was concentrated to give a white, solid resin. To the thus obtained resin were added 10% by weight of hexamine and heated at 170° C. to obtain an infusible product, the thermal resistance of which is given in Table 1.

EXAMPLE 11

188 g. of phenol, 66 g. of m-cresol and 165 g. of formalin (formaldehyde content: 37% by weight. The same is referred to the following examples) were charged in a four-neck flask and 1.8 ml. of 1N HCl were then added while stirring. The reaction was allowed to proceed at 100° C. for 80 minutes, followed by removal of water under reduced pressure. To the resulting reaction mixture 8 ml. of a 10% aqueous solution of potassium hydroxide were added at 100° C., immediately whereupon 54 g. of tetraethoxysilane were added and heated to 130° C. The reaction was allowed to proceed for 100 minutes and then the reaction mixture was concentrated to give a white, solid resin. To the thus obtained resin were added 10% by weight of hexamine and heated at 170° C. to obtain an infusible product, the thermal resistance of which is given in Table 1.

COMPARATIVE EXAMPLE 245 g. of phenol and 165 g. of formalin were charged in a four-neck flask and 2 ml. of 1N HCl were added while stirring, whereupon the reaction was allowed to proceed at 95° C. for 120 minutes, followed by concentration under reduced pressure to obtain a solid novolak. The novolak was mixed with 10% by weight of hexamine and heated to effect hardening. The thermal property of the thus obtained thermohardened resin is shown in Table 1.

Table 1

| Result of Thermogravimetric Analysis | | | |
|---|---|---|---|
| Temperature at which the resin is caused to show a weight loss of 6%* | | | |
| No. of Example | Temperature, ° C. | No. of Example | Temperature, ° C. |
| 1 | 405 | 10 | 400 |
| 2 | 420 | 11 | 405 |
| 3 | 420 | | |
| 4 | 420 | | |
| 5 | 420 | | |
| 6 | 420 | | |
| 7 | 420 | | |
| 8 | 420 | Comparative | |
| 9 | 430 | Example | 280 |

What is claimed is:

1. A thermosetting resin, the thermoset resin obtained therefrom having such a thermal resistance that the temperature at which the thermoset resin is caused to show a weight loss of 6% by heating at a temperature elevation rate of 10° C. per minute is at least 400° C., which comprises a reaction product of a novolak which is obtained by the reaction of a phenol and an aldehyde in the presence of an acid catalyst or a novolak type aryl-modified phenolic resin which is obtained by the reaction of a phenol and an aromatic hydrocarbon-aldehyde condensation initial-stage reaction product with a member selected from the group consisting of a silicic acid ester of the formula Si(OR)$_4$ wherein R represents alkyl or aryl and a mixture of a silicic acid ester of the formula as defined above and a titanic acid ester of the formula Ti(OR)$_4$ wherein R has the same meaning as defined above, said reaction product having such structure that the silicon is or silicon and titanium are bonded directly to oxygens of the phenolic hydroxyl groups while 20 - 70 mole %, based on the amount of phenol present in the starting system to be reacted with said member, of the phenolic hydroxyl groups, in terms of the amount of phenol, are left in the free form.

2. A thermosetting resin according to claim 1 wherein said phenol is a member selected from the group consisting of monohydroxybenzene, cresol, 2,2-bis(p-hydroxyphenyl)-propane, 2,6-bis(2-hydroxybenzyl)-phenol and mixtures thereof.

3. A thermosetting resin according to claim 1 wherein said aromatic hydrocarbon-aldehyde condensation initial-stage reaction product has an average molecular weight of 250 - 1,000 and is a member selected from the group consisting of xylene-aldehyde, cymene-aldehyde, 1,2,4-trimethylbenzene-aldehyde, durene-aldehyde, naphthalene-aldehyde, pentamethylbenzene-aldehyde and acenaphthylene-aldehyde resins.

4. A thermosetting resin according to claim 1 wherein said silicic acid ester is a member selected from the group consisting of tetramethoxysilane, tetraethoxysilane, tetrapropoxysilane, tetrabutoxysilane, tetraphenoxysilane and tetrabenzyloxysilane and mixtures thereof.

5. A thermosetting resin according to claim 1 wherein said titanic acid ester is a member selected from the group consisting of titanium tetraisopropoxide, titanium tetrabutoxide, tetra(2-ethyl)hexyl titanate, tetrastearyl titanate, titanyl acetylacetonate, titanium tetraphenoxide and mixture thereof.

6. A thermosetting resin according to claim 1 wherein said aldehyde is a member selected from the group consisting of formaldehyde, acetaldehyde and furfural.

7. A process for preparing a thermosetting resin which comprises reacting a novolak which is obtained by the reaction of a phenol and an aldehyde in the presence of an acid catalyst or a novolak type aryl-modified phenolic resin which is obtained by the reaction of a phenol and an aromatic hydrocarbon-aldehyde condensation initial-stage reaction product with a member selected from the group consisting of a silicic acid ester of the formula Si(OR)$_4$ wherein R represents alkyl or aryl and a mixture of a silicic acid ester of the formula as defined above and a titanic acid ester of the formula Ti(OR)$_4$ wherein R has the same meaning as defined above in the presence of an alkaline catalyst while keeping the reaction system in a molten state, said member being employed in an amount of 0.02 - 0.2 molar equivalents, based on the amount of phenol present in the starting system to be reacted with said member.

8. A process for preparing a thermosetting resin according to claim 7 wherein said reaction system has a pH value of 7.5 - 10.0.

9. A process according to claim 7 wherein the reaction of said novolak or said phenolic resin with said member is carried out for a period of 20 - 150 minutes.

10. A process according to claim 7 wherein said phenol is a member selected from the group consisting of monohydroxybenzene, cresol, 2,2-bis(p-hydroxyphenyl)-propane, 2,6-bis-(2-hydroxybenzyl)phenol and mixtures thereof.

11. A process according to claim 7 wherein said aromatic hydrocarbon-aldehyde condensation initial-stage reaction product has an average molecular weight of 250 – 1,000 and is a member selected from the group consisting of xylene-aldehyde, cymene-aldehyde, 1,2,4-trimethylbenzene-aldehyde, durene-aldehyde, naphthalene-aldehyde, pentamethylbenzene-aldehyde and acenaphthylene-aldehyde resins.

12. A process according to claim 7 wherein said silicic acid ester is a member selected from the group consisting of tetramethoxysilane, tetraethoxysilane, tetrapropoxysilane, tetrabutoxysilane, tetraphenoxysilane and tetrabenzyloxysilane and mixtures thereof.

13. A process according to claim 7 wherein said titanic acid ester is a member selected from the group consisting of titanium tetraisopropoxide, titanium tetrabutoxide, tetra(2-ethyl)hexyl titanate, tetrastearyl titanate, titanyl acetylacetonate, titanium tetraphenoxide and mixtures thereof.

14. A process according to claim 7 wherein said aldehyde is a member selected from the group consisting of formaldehyde, acetaldehyde and furfural.

* * * * *